(12) United States Patent
Qiu et al.

(10) Patent No.: US 12,195,575 B2
(45) Date of Patent: Jan. 14, 2025

(54) COMPOSITIONS AND METHODS FOR METAL PRE-TREATMENT

(71) Applicant: CHEMETALL GMBH, Frankfurt (DE)

(72) Inventors: Xueting Qiu, New Providence, NJ (US); Stuart Schock, New Providence, NJ (US)

(73) Assignee: CHEMETALL GMBH, Frankfurt (DE)

( * ) Notice: Subject to any disclaimer, the term of this patent is extended or adjusted under 35 U.S.C. 154(b) by 358 days.

(21) Appl. No.: 17/625,570

(22) PCT Filed: Jul. 15, 2020

(86) PCT No.: PCT/EP2020/069922
§ 371 (c)(1),
(2) Date: Jan. 7, 2022

(87) PCT Pub. No.: WO2021/009186
PCT Pub. Date: Jan. 21, 2021

(65) Prior Publication Data
US 2022/0289892 A1    Sep. 15, 2022

(30) Foreign Application Priority Data
Jul. 15, 2019    (EP) .................................... 19186187

(51) Int. Cl.
| | | |
|---|---|---|
| *C08G 18/10* | (2006.01) | |
| *C08G 18/08* | (2006.01) | |
| *C08G 18/24* | (2006.01) | |
| *C08G 18/28* | (2006.01) | |
| *C08G 18/32* | (2006.01) | |

(Continued)

(52) U.S. Cl.
CPC ......... *C08G 18/10* (2013.01); *C08G 18/0847* (2013.01); *C08G 18/248* (2013.01); *C08G 18/282* (2013.01); *C08G 18/3206* (2013.01); *C08G 18/348* (2013.01); *C08G 18/791* (2013.01); *C09D 5/086* (2013.01);
(Continued)

(58) Field of Classification Search
CPC ......................... C08G 18/0847; C08G 18/282; C08G 18/248; C09D 175/08; C09D 175/12; C09D 5/086
See application file for complete search history.

(56) References Cited

U.S. PATENT DOCUMENTS

| | | |
|---|---|---|
| 3,966,502 A | 6/1976 | Binns |
| 4,132,572 A | 1/1979 | Parant et al. |

(Continued)

FOREIGN PATENT DOCUMENTS

| | | |
|---|---|---|
| CN | 105951084 B | 10/2018 |
| EP | 1178151 A1 | 2/2002 |

(Continued)

OTHER PUBLICATIONS

International Search Report and Written Opinion for corresponding PCT/EP2020/069922 mailed Oct. 15, 2020.

*Primary Examiner* — Michael L Leonard
(74) *Attorney, Agent, or Firm* — Armstrong Teasdale LLP

(57) ABSTRACT

Described herein is a composition including at least one polyurethane polymer. Also described herein are a method of using the composition including at least one polyurethane polymer for metal pre-treatment and a process for metal pre-treatment.

17 Claims, 1 Drawing Sheet

(51) Int. Cl.
*C08G 18/34* (2006.01)
*C08G 18/79* (2006.01)
*C09D 5/08* (2006.01)
*C09D 175/08* (2006.01)
*C09D 175/12* (2006.01)

(52) U.S. Cl.
CPC ......... *C09D 175/08* (2013.01); *C09D 175/12* (2013.01); *C08G 2150/90* (2013.01)

(56) References Cited

U.S. PATENT DOCUMENTS

| | | | |
|---|---|---|---|
| 4,757,105 A * | 7/1988 | Kopp | C08G 18/7825 528/53 |
| 4,795,796 A * | 1/1989 | Haubennestel | C08G 18/282 528/49 |
| 5,653,823 A | 8/1997 | McMillen et al. | |
| 2002/0088583 A1* | 7/2002 | Doi | D21H 21/20 162/164.1 |
| 2004/0167266 A1 | 8/2004 | Hasegawa et al. | |
| 2007/0259120 A1* | 11/2007 | Haubennestel | C08G 18/4277 564/123 |
| 2008/0194757 A1* | 8/2008 | Fujita | C08G 18/348 524/538 |
| 2010/0068513 A1 | 3/2010 | Kikuch et al. | |
| 2013/0177768 A1 | 7/2013 | Krueger et al. | |

FOREIGN PATENT DOCUMENTS

| | | | | |
|---|---|---|---|---|
| EP | 1353005 A1 * | 10/2003 | | C08G 18/0814 |
| EP | 1426466 A1 | 6/2004 | | |
| EP | 1798248 A1 | 6/2007 | | |
| EP | 1852523 A1 | 11/2007 | | |

* cited by examiner

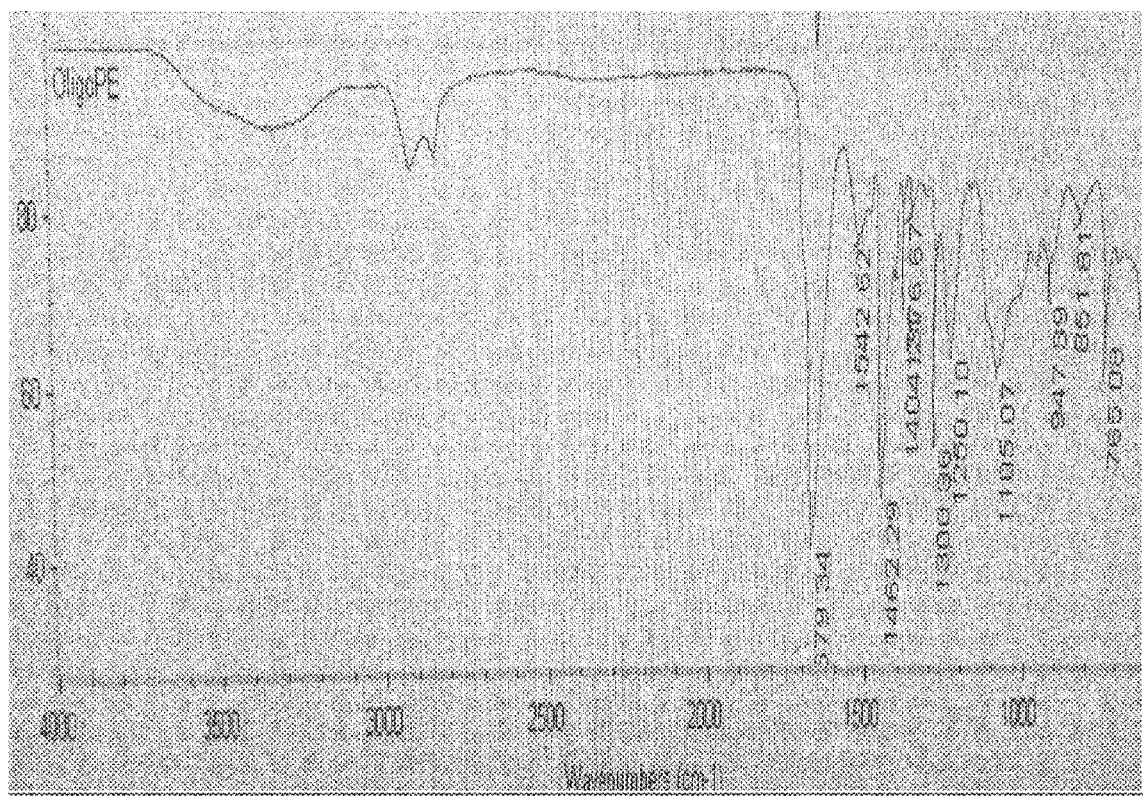

COMPOSITIONS AND METHODS FOR METAL PRE-TREATMENT

CROSS-REFERENCE TO RELATED APPLICATIONS

This application is a U.S. National Phase Application of International Patent Application No. PCT/EP2020/069922, filed Jul. 15, 2020, which claims priority to European Patent Application No. 19186187.1, filed Jul. 15, 2019, the entire contents of which are hereby incorporated by reference herein.

TECHNICAL FIELD

The presently claimed invention relates to a composition comprising at least one polyurethane polymer. The presently claimed invention further relates to the use of the composition comprising the polyurethane polymer for metal pre-treatment and a process for metal pre-treatment.

BACKGROUND

Protective metal coating which is also referred to as conversion coating is a common practise that involves metal surface treatment to enhance the corrosion resistance. The metalworking fluid (MWF) technology utilizes various phosphates, sulphonates or silicates which primarily function as corrosion inhibitor in the formulations. However, phosphorus or sulfur containing compounds have inherent shortcomings of accumulating excessive nutrients in the aqueous systems causing microbial proliferation. Although silicates do not cause microbial growth, low hydrocarbyl silicates have gelling or precipitation issues due to their tendency to form insoluble three-dimensional networks in the aqueous systems. The phosphate treatments to the metallic surfaces have been applied traditionally to impart corrosion. However, phosphate treatment has a problem of sludge formation as a by-product.

In the state of the art, metal treatment composition and methods are known and described, for instance, in the following references.

U.S. Pat. No. 3,966,502 A discloses a chrome free rinse process and solutions for treating metal surfaces such as iron, zinc, steel, aluminum, and alloys thereof by contacting the metal surface with an aqueous composition consisting of a soluble zirconium containing compound.

U.S. Pat. No. 4,132,572 A discloses a process to treat steel, aluminum, aluminum alloys, zinc, zinc alloys with an aqueous solution of a flurophosphate salt to passivate the metal surface.

U.S. Pat. No. 5,653,823 A discloses a non-chrome post-rinse composition comprising the reaction product of an epoxy-functional material containing at least two epoxy groups, an alkanolamine, or a mixture of alkanolamines for treating phosphate metal substrates.

The methods and compositions disclosed in the prior arts have limitations. The compositions described in the prior arts disclose non-chromium pre-treatment that are more sensitive to different intermetallic composition of metal alloys in terms of the performance. The organic oligomers and polymers known in the prior-art to treat intermetallic compositions have limitations with respect to solubility and stability in the final product.

There is a need for an improved metal pre-treatment composition and a method that can overcome the above-mentioned drawbacks.

Hence, it is an object of the presently claimed invention to provide a metal pre-treatment composition that is stable and shows improved performance such as adhesion, T-bend, reverse impact and corrosion resistance on various different substrates such as aluminium and cold rolled sheet.

SUMMARY

Surprisingly, it was found that a metal pre-treatment composition comprising salicylic acid-functionalized polyurethane oligomers demonstrated good stability and improved performance such as adhesion, stability, T-bend, reverse impact and corrosion resistance on various different substrates such as aluminium and cold rolled sheet. In addition, salicylic acid-functionalized polyurethane oligomers easily blends into the metal pre-treatment composition and is less sensitive to metal alloy variation and can be used in a multi-metal or metal alloy composition.

Accordingly, in one aspect, the presently claimed invention is directed to a polyurethane polymer which is obtainable by (i) preparation of at least one isocyanate-functional prepolymer (A) by reacting a mixture comprising at least one polyisocyanate (B) and at least one alkanolamine (C);

(ii) subsequent reaction of the at least one isocyanate-functional prepolymer (A) with at least one compound of general formula (I),

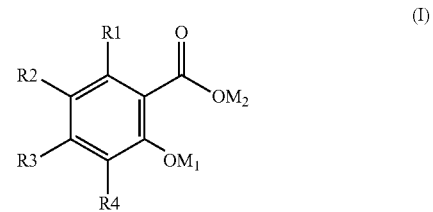

wherein,

R1, R2, R3 and R4, independent of each other, are selected from the group consisting of hydrogen, —C(=O)—OH, —C(=O)—OM$_3$, —OSO$_3$H, —OSO$_3$M$_3$, —OH, —OM$_3$, —C(=O)—H, —O—C$_{1-6}$-alkyl, —F, —Cl, —CN, —Br, —NH$_2$, —NHR and —NRR', wherein at least one of R1, R2, R3 and R4 is selected from the group consisting of —NH$_2$ and —NHR, M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra);

M$_3$ are, identical or different, a metal cation selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and R and R' are, identical or different, linear or branched, unsubstituted $C_1$-$C_6$ alkyl.

In another aspect, the presently claimed invention is directed to an aqueous composition comprising at least one polyurethane polymer described herein and water.

In yet another aspect, the presently claimed invention is directed to a metal pre-treatment composition comprising the aqueous composition described herein and at least one water-soluble metal-salt or metal.

In another aspect, the presently claimed invention is directed to the use of the metal pre-treatment composition described herein for coating a metal substrate.

In yet another aspect, the presently claimed invention is directed to a method for pre-treating a metal substrate comprising at least the step of contacting a metal substrate with the metal pre-treatment composition described herein.

In another aspect, the presently claimed invention is directed to a coated metal substrate obtainable by a method for pre-treating a metal substrate described herein.

The presently claimed invention is associated with at least one of the following advantages:

(i) The salicylic acid-functionalized polyurethane oligomers of the presently claimed invention easily blends into a metal pre-treatment composition and the metal pre-treatment performance is less sensitive to metal alloy variation and is also stable in a multi-metal composition.

(ii) The aqueous composition or the metal pre-treatment composition of the presently claimed invention enables improved corrosion resistance, stability, T-bend, reverse impact and adhesion.

Other objects, advantages and applications of the presently claimed invention will become apparent to those skilled in the art from the following detailed description.

DESCRIPTION OF FIGURES

FIG. 1: FTIR of oligomer A indicated the overlapping of OH O-H Stretch, (broad, s) with Urea N—H stretch 3400-3300 (M) at wavenumber range (3100 to 3700).

DETAILED DESCRIPTION

The following detailed description is merely exemplary in nature and is not intended to limit the presently claimed invention or the application and uses of the presently claimed invention. Furthermore, there is no intention to be bound by any theory presented in the preceding technical field, background, summary or the following detailed description.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the subject matter described herein are capable of operation in other sequences than described or illustrated herein. In case the terms "(A)", "(B)" and "(C)" or "(a)", "(b)", "(c)", "(d)", "(i)", "(ii)" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Reference throughout this specification to "one embodiment" or "an embodiment" or "preferred embodiment" means that a particular feature, structure or characteristic described in connection with the embodiment is included in at least one embodiment of the presently claimed invention. Thus, appearances of the phrases "in one embodiment" or "in an embodiment" or "in a preferred embodiment" in various places throughout this specification are not necessarily all referring to the same embodiment but may refer. Furthermore, the features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the subject matter, and form different embodiments, as would be understood by those in the art. For example, in the appended claims, any of the claimed embodiments can be used in any combination.

Furthermore, the ranges defined throughout the specification include the end values as well, i.e. a range of 1 to 10 implies that both 1 and 10 are included in the range. For the avoidance of doubt, the applicant shall be entitled to any equivalents according to applicable law.

For the purposes of the presently claimed invention, the term 'aqueous' is defined as a system which comprises a significant fraction of water as the main dispersion medium.

Reference throughout this specification for compound names starting with 'poly' designate substances, which formally contain per molecule, two or more of the functional groups. The compound itself can be monomeric, oligomeric or polymeric compound. For instance, a polyol is a compound having two or more hydroxy groups, a polyisocyanate is a compound having two or more isocyanate groups.

Reference throughout this specification to the term 'prepolymer' refers to a monomer or system of monomers that have been reacted to an intermediate molecular mass state. This material is capable of further polymerization by reactive groups to a fully cured high molecular weight state.

Reference throughout this specification to the term 'oligomer' denotes a molecule that consists of 2-10 monomers but does not necessarily have a molecular mass distribution.

For the purposes of the presently claimed invention, a cation is defined as a positively charged ion and has a natural ability to move toward the negative electrode in electrolysis.

For the purposes of the presently claimed invention, aliphatic isocyanates are defined as isocyanates, in which the NCO group is not directly attached to an aromatic ring.

For the purposes of the presently claimed invention, functional polymers/oligomers or functionalized polymers/oligomers are defined as polymers/oligomers whose properties are determined by the functional groups present in the polymers/oligomers that are dissimilar to the backbone chains.

For the purposes of the presently claimed invention, 'metal pre-treatment' is defined as the treatment of metal surfaces or metal parts before preparing the metal workpiece for end use such as painting.

For the purposes of the presently claimed invention, the term "curing" denotes the heat-initiated crosslinking of a coating film, with either self-crosslinking binders or else a separate crosslinking agent, in combination with a polymer as binder, (external crosslinking), being used in the parent coating material.

For the purposes of the presently claimed invention, the hydroxyl number or OH number indicates the amount of potassium hydroxide, in milligrams, which is equivalent to the molar amount of acetic acid bound during the acetylation of one gram of the constituent in question.

For the purposes of the presently claimed invention, unless otherwise indicated, the hydroxyl number is determined experimentally by titration in accordance with DIN 53240-2.

For the purposes of the presently claimed invention, the mass-average (Mw) and number-average (Mn) molecular weight is determined by means of gel permeation chromatography at 40° C., using a high-performance liquid chromatography pump and a refractive index detector. The eluent used was tetrahydrofuran with an elution rate of 1 ml/min. The calibration is carried out by means of polystyrene standards.

For the purposes of the presently claimed invention, '%' by weight' or 'wt. %' as used in the presently claimed invention is with respect to the total weight of the coating composition. Further, the sum of wt.-% of all the compounds, as described herein, in the respective components adds up to 100 wt.-%.

The measurement techniques described hereinabove and herein are well known to a person skilled in the art and therefore do not limit the presently claimed invention.

An aspect of the presently claimed invention describes a polyurethane polymer which is obtainable by
(i) preparation of at least one isocyanate-functional prepolymer (A) by reacting a mixture comprising at least one polyisocyanate (B) and at least one alkanolamine (C);
(ii) subsequent reaction of the at least one isocyanate-functional prepolymer (A) with at least one compound of general formula (I),

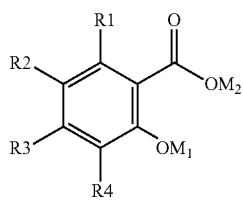

(I)

wherein,
R1, R2, R3 and R4, independent of each other, are selected from the group consisting of hydrogen, —C(=O)—OH, —C(=O)—OM$_3$, —OSO$_3$H, —OSO$_3$M$_3$, —OH, —OM$_3$, —C(=O)—H, —O—C$_{1-6}$-alkyl, —F, —Cl, —CN, —Br, —NH$_2$, —NHR and —NRR', wherein at least one of R1, R2, R3 and R4 is selected from the group consisting of —NH$_2$ and —NHR, M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_3$ are, identical or different, a metal cation selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and R and R' are, identical or different, linear or branched, unsubstituted C$_1$-C$_6$ alkyl.

In a preferred embodiment of the presently claimed invention, the molar ratio of the at least one isocyanate-functional prepolymer (A) to the at least one compound of general formula (I) described herein is in the range of ≥0.05 to ≤0.5. In a more preferred embodiment of the presently claimed invention, the molar ratio of the at least one isocyanate-functional prepolymer (A) to the at least one compound of general formula (I) described herein is in the range of ≥0.1 to ≤0.3.

Isocyanate-Functional Prepolymer (A)

The polyurethane polymer of the presently claimed invention is obtainable by (i) preparation of at least one isocyanate-functional prepolymer (A). The at least one isocyanate-functional prepolymer (A) is obtained by reacting a mixture comprising at least one polyisocyanate (B) and at least one alkanolamine (C).

In an embodiment of the presently claimed invention, the polyisocyanate (B) is an aliphatic polyisocyanate. In another embodiment of the presently claimed invention, the aliphatic polyisocyanate (B) is modified by an at least one group selected from an allophanate group, a biuret group, an uretdione group, an isocyanurate group and/or an iminooxadiazinedione group.

In a preferred embodiment of presently claimed invention, the polyisocyanate (B) is selected from the group consisting of 1,6-hexamethylene diisocyanate (HDI), methylene dicyclohexyl diisocyanate, tetramethylene diisocyanate, 1,5-pentamethylene diisocyanate, 2,2,4- (or 2,4,4-) trimethyl-1,6-hexamethylene diisocyanate, hydrogenated methylene diisocyanate (HMDI) and isophorone diisocyanate (IPDI). In another preferred embodiment of presently claimed invention, the polyisocyanate (B) is selected from the group consisting of 1,6-hexamethylene diisocyanate (HDI), methylene dicyclohexyl diisocyanate, tetramethylene diisocyanate, 1,5-pentamethylene diisocyanate, 2,2,4- (or 2,4,4-) trimethyl-1,6-hexamethylene diisocyanate, hydrogenated methylene diisocyanate (HMDI) and isophorone diisocyanate (IPDI) modified by one allophanate group, biuret group, uretdione group, isocyanurate group and/or iminooxadiazinedione group. In a more preferred embodiment of presently claimed invention, the polyisocyanate (B) is selected from the group consisting of 1,6-hexamethylene diisocyanate (HDI), hydrogenated methylene diisocyanate (HMDI) and isophorone diisocyanate (IPDI) or 1,6-hexamethylene diisocyanate (HDI), hydrogenated methylene diisocyanate (HMDI) and isophorone diisocyanate (IPDI) all of which are unmodified or modified by at least one group selected from an allophanate group, a biuret group, an uretdione group, an isocyanurate group and/or an iminooxadiazinedione group.

In another preferred embodiment of presently claimed invention, the polyisocyanate (B) is selected from the group consisting of 1,6-hexamethylene diisocyanate (HDI), and 1,5-pentamethylene diisocyanate, all of which are unmodified or modified by at least one group selected from an allophanate group, a biuret group, an uretdione group, an isocyanurate group and/or an iminooxadiazinedione group.

In another embodiment of the presently claimed invention, the alkanolamine (C) is selected from the group consisting of triethanolamine, triisopropanolamine, N-methyl-ethanolamine, N-ethyl-ethanolamine, N-butyl-ethanolamine, N-methyl-diethanolamine, N-ethyl-diethanolamine, N-butyl-diethanolamine and N,N-dimethylethanolamine.

In a preferred embodiment of the presently claimed invention, the alkanolamine (C) is selected from the group consisting of N,N-dimethylethanolamine, N-butyl-diethanolamine, N-methyl-ethanolamine, N-ethyl-ethanolamine, N-butyl-ethanolamine, N-methyl-diethanolamine and N-ethyl-diethanolamine.

In an embodiment of the presently claimed invention, the mixture comprises at least one hydroxy-functional polymer (D) selected from the group consisting of polyethylene glycol monoalkyl ether and polypropylene glycol monoalkyl ether.

In another embodiment of the presently claimed invention, the hydroxy-functional polymer (D) has a weight average molecular weight in the range of ≥150 g/mol to ≤15000 g/mol, determined according to gel permeation chromatography against a polystyrene standard. In a preferred embodiment of the presently claimed invention, the hydroxy-functional polymer (D) has a weight average molecular weight in the range of ≥250 g/mol to ≤500 g/mol In a yet another embodiment of the presently claimed invention, the hydroxy-functional polymer (D) has a hydroxyl number in the range of ≥25 mg KOH/g to ≤400 mg KOH/g, determined according to DIN 53240-2. In a preferred embodiment of the presently claimed invention, the hydroxy-functional polymer (D) has a hydroxyl number in the range of ≥100 mg KOH/g to ≤300 mg KOH/g, determined according to DIN 53240-2.

The polyurethane polymer of the presently claimed invention is obtainable by (i) preparation of at least one isocyanate-functional prepolymer (A) by reacting a mixture comprising at least one polyisocyanate (B) and at least one alkanolamine (C) and (ii) subsequent reaction of the at least one isocyanate-functional prepolymer (A) with at least one compound of general formula (I),

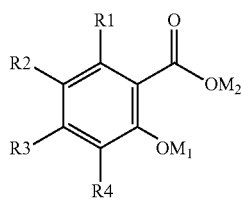

(I)

wherein,
R1, R2, R3 and R4, independent of each other, are selected from the group consisting of hydrogen, —C(=O)—OH, —C(=O)—OM$_3$, —OSO$_3$H, —OSO$_3$M$_3$, —OH, —OM$_3$, —C(=O)—H, —O—C$_{1-6}$-alkyl, —F, —Cl, —CN, —Br, —NH$_2$, —NHR and —NRR', wherein at least one of R1, R2, R3 and R4 is selected from the group consisting of —NH$_2$ and —NHR, M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_3$ are, identical or different, a metal cation selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and R and R' are, identical or different, linear or branched, unsubstituted C$_1$-C$_6$ alkyl.

In an embodiment of the presently claimed invention, R1, R2, R3 and R4 in formula (I), independent of each other, are selected from the group consisting of hydrogen, —F, —Cl, —CN, —Br, —NH2, —NHR and —NRR', wherein at least one of R1, R2, R3 and R4 is selected from the group consisting of —NH2 and —NHR.

In a preferred embodiment of the presently claimed invention, M$_1$ in formula (I) is selected from metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra).

In a preferred embodiment of the presently claimed invention, M$_2$ in formula (I) is selected from metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra).

In another embodiment of the presently claimed invention, the compound of general formula (I) is selected from the group consisting of 3-aminosalicylic acid, 4-aminosalicylic acid, 5-aminosalicylic acid and 6-aminosalicylic acid, and sodium salts thereof.

In a preferred embodiment of the presently claimed invention, a polyurethane polymer is obtainable by
(i) preparation of at least one isocyanate-functional prepolymer (A) by reacting a mixture comprising at least one aliphatic polyisocyanate (B) and at least one alkanolamine (C);
(ii) subsequent reaction of the at least one isocyanate-functional prepolymer (A) with at least one compound of general formula (I),

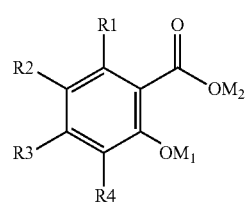

(I)

wherein,
R1, R2, R3 and R4, independent of each other, are selected from the group consisting of hydrogen, —C(=O)—OH, —C(=O)—OM$_3$, —OSO$_3$H, —OSO$_3$M$_3$, —OH, —OM$_3$, —C(=O)—H, —O—C$_{1-6}$-alkyl, —F, —Cl, —CN, —Br, —NH2, —NHR and —NRR', wherein at least one of R1, R2, R3 and R4 is selected from the group consisting of —NH$_2$ and —NHR, M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_3$ are, identical or different, is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and R and R' are, identical or different, linear or branched, unsubstituted C$_1$-C$_6$ alkyl.

In a preferred embodiment of the presently claimed invention, a polyurethane polymer is obtainable by
(i) preparation of at least one isocyanate-functional prepolymer (A) by reacting a mixture comprising at least one aliphatic polyisocyanate (B) and at least one alkanolamine (C) selected from the group consisting of triethanolamine, triisopropanolamine, N-methyl-ethanolamine, N-ethyl-ethanolamine, N-butyl-ethanolamine, N-methyl-diethanolamine, N-ethyl-diethanolamine, N-butyl-diethanolamine and N,N-dimethylethanolamine;
(ii) subsequent reaction of the at least one isocyanate-functional prepolymer (A) with at least one compound of general formula (I),

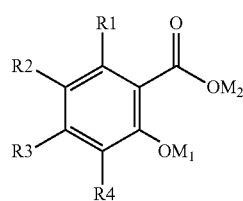

wherein,
R1, R2, R3 and R4, independent of each other, are selected from the group consisting of hydrogen, —C(=O)—OH, —C(=O)—OM$_3$, —OSO$_3$H, —OSO$_3$M$_3$, —OH, —OM$_3$, —C(=O)—H, —O—C$_{1-6}$-alkyl, —F, —Cl, —CN, —Br, —NH$_2$, —NHR and —NRR', wherein at least one of R1, R2, R3 and R4 is selected from the group consisting of —NH$_2$ and —NHR, M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_3$ are, identical or different, a metal cation selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and R and R' are, identical or different, linear or branched, unsubstituted C$_1$-C$_6$ alkyl.

In a preferred embodiment of the presently claimed invention, a polyurethane polymer is obtainable by
(i) preparation of at least one isocyanate-functional prepolymer (A) by reacting a mixture comprising at least one aliphatic polyisocyanate (B) which is modified by at least one group selected from an allophanate group, a biuret group, an uretdione group, an isocyanurate group and/or an iminooxadiazinedione group and at least one alkanolamine (C) selected from the group consisting of triethanolamine, triisopropanolamine, N-methyl-ethanolamine, N-ethyl-ethanolamine, N-butyl-ethanolamine, N-methyl-diethanolamine, N-ethyl-diethanolamine, N-butyl-diethanolamine and N,N-dimethylethanolamine;
(ii) subsequent reaction of the at least one isocyanate-functional prepolymer (A) with at least one compound of general formula (I),

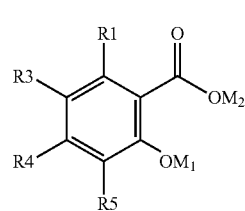

wherein,
R1, R2, R3 and R4, independent of each other, are selected from the group consisting of hydrogen, —C(=O)—OH, —C(=O)—OM$_3$, —OSO$_3$H, —OSO$_3$M$_3$, —OH, —OM$_3$, —C(=O)—H, —O—C$_{1-6}$-alkyl, —F, —Cl, —CN, —Br, —NH$_2$, —NHR and —NRR', wherein at least one of R1, R2, R3 and R4 is selected from the group consisting of —NH$_2$ and —NHR, M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_3$ are, identical or different, a metal cation selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and R and R' are, identical or different, linear or branched, unsubstituted C$_1$-C$_6$ alkyl.

In another preferred embodiment of the presently claimed invention, a polyurethane polymer is obtainable by
(i) preparation of at least one isocyanate-functional prepolymer (A) by reacting a mixture comprising at least one aliphatic polyisocyanate (B) and at least one alkanolamine (C) selected from the group consisting of triethanolamine, triisopropanolamine, N-methyl-ethanolamine, N-ethyl-ethanolamine, N-butyl-ethanolamine, N-methyl-diethanolamine, N-ethyl-diethanolamine, N-butyl-diethanolamine and N,N-dimethylethanolamine;
(ii) subsequent reaction of the at least one isocyanate-functional prepolymer (A) with at least one compound of general formula (I),

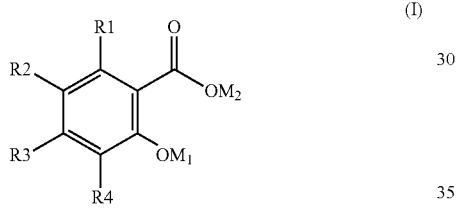

(I)

wherein,
R1, R2, R3 and R4, independent of each other, are selected from the group consisting of hydrogen, —F, —Cl, —CN, —Br, —NH$_2$, —NHR and —NRR', wherein at least one of R1, R2, R3 and R4 is selected from the group consisting of —NH$_2$ and —NHR, M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and R and R' are, identical or different, linear or branched, unsubstituted C$_1$-C$_6$ alkyl.

In another preferred embodiment of the presently claimed invention, a polyurethane polymer is obtainable by
(i) preparation of at least one isocyanate-functional prepolymer (A) by reacting a mixture comprising at least one aliphatic polyisocyanate (B), at least one alkanolamine (C) and at least one hydroxy-functional polymer (D);
(ii) subsequent reaction of the at least one isocyanate-functional prepolymer (A) with at least one compound of general formula (I),

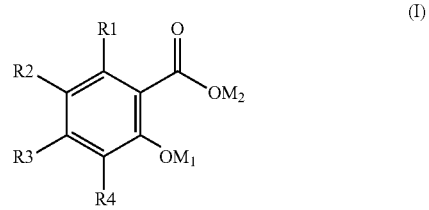

(I)

wherein,
R1, R2, R3 and R4, independent of each other, are selected from the group consisting of hydrogen, —C(=O)—OH, —C(=O)—OM$_3$, —OSO$_3$H, —OSO$_3$M$_3$, —OH, —OM$_3$, —C(=O)—H, —O—C$_{1-6}$-alkyl, —F, —Cl, —CN, —Br, —NH$_2$, —NHR and —NRR', wherein at least one of R1, R2, R3 and R4 is selected from the group consisting of —NH$_2$ and —NHR, M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_3$ are, identical or different, a metal cation selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and R and R' are, identical or different, linear or branched, unsubstituted C$_1$-C$_6$ alkyl.

In another preferred embodiment of the presently claimed invention, a polyurethane polymer is obtainable by
(i) preparation of at least one isocyanate-functional prepolymer (A) by reacting a mixture comprising at least one aliphatic polyisocyanate (B), at least one alkanolamine (C) and at least one hydroxy-functional polymer (D) selected from the group consisting of polyethylene glycol monoalkyl ether and polypropylene glycol monoalkyl ether;
(ii) subsequent reaction of the at least one isocyanate-functional prepolymer (A) with at least one compound of general formula (I),

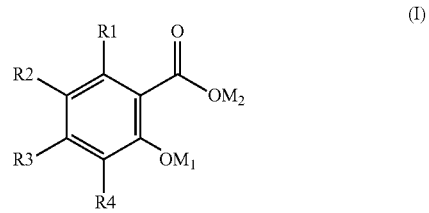

(I)

wherein,
R1, R2, R3 and R4, independent of each other, are selected from the group consisting of hydrogen, —F, —Cl, —CN, —Br, —NH$_2$, —NHR and —NRR', wherein at least one of R1, R2, R3 and R4 is selected from the group consisting of —NH$_2$ and —NHR, M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and R and R' are, identical or different, linear or branched, unsubstituted C$_1$-C$_6$ alkyl.

In another preferred embodiment of the presently claimed invention, a polyurethane polymer is obtainable by
  (i) preparation of at least one isocyanate-functional prepolymer (A) by reacting a mixture comprising at least one aliphatic polyisocyanate (B), at least one alkanolamine (C) selected from the group consisting of triethanolamine, triisopropanolamine, N-methyl-ethanolamine, N-ethyl-ethanolamine, N-butyl-ethanolamine, N-methyl-diethanolamine, N-ethyl-diethanolamine, N-butyl-diethanolamine and N,N-dimethylethanolamine and at least one hydroxy-functional polymer (D) selected from the group consisting of polyethylene glycol monoalkyl ether and polypropylene glycol monoalkyl ether;
  (ii) subsequent reaction of the at least one isocyanate-functional prepolymer (A) with at least one compound of general formula (I),

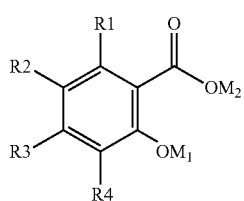

wherein,
  R1, R2, R3 and R4, independent of each other, are selected from the group consisting of hydrogen, —F, —Cl, —CN, —Br, —NH$_2$, —NHR and —NRR', wherein at least one of R1, R2, R3 and R4 is selected from the group consisting of —NH$_2$ and —NHR,
  M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra),
  M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and
  R and R' are, identical or different, linear or branched, unsubstituted C$_1$-C$_6$ alkyl.

In a preferred embodiment of the presently claimed invention, a polyurethane polymer is obtainable by
  (i) preparation of at least one isocyanate-functional prepolymer (A) by reacting a mixture comprising at least one aliphatic polyisocyanate (B) and at least one alkanolamine (C);
  (ii) subsequent reaction of the at least one isocyanate-functional prepolymer (A) with at least one with at least one compound selected from the group consisting of 3-aminosalicylic acid, 4-aminosalicylic acid, 5-aminosalicylic acid and 6-aminosalicylic acid, and sodium salts thereof.

In a preferred embodiment of the presently claimed invention, a polyurethane polymer is obtainable by
  (i) preparation of at least one isocyanate-functional prepolymer (A) by reacting a mixture comprising at least one aliphatic polyisocyanate (B), at least one alkanolamine (C) and at least one hydroxy-functional polymer (D);
  (ii) subsequent reaction of the at least one isocyanate-functional prepolymer (A) with at least one with at least one compound selected from the group consisting of 3-aminosalicylic acid, 4-aminosalicylic acid, 5-aminosalicylic acid and 6-aminosalicylic acid, and sodium salts thereof.

In a preferred embodiment of the presently claimed invention, a polyurethane polymer is obtainable by
  (i) preparation of at least one isocyanate-functional prepolymer (A) by reacting a mixture comprising at least one aliphatic polyisocyanate (B), at least one alkanolamine (C) and at least one hydroxy-functional polymer (D) selected from the group consisting of polyethylene glycol monoalkyl ether and polypropylene glycol monoalkyl ether;
  (ii) subsequent reaction of the at least one isocyanate-functional prepolymer (A) with at least one with at least one compound selected from the group consisting of 3-aminosalicylic acid, 4-aminosalicylic acid, 5-aminosalicylic acid and 6-aminosalicylic acid, and sodium salts thereof.

In a preferred embodiment of the presently claimed invention, a polyurethane polymer is obtainable by
  (i) preparation of at least one isocyanate-functional prepolymer (A) by reacting a mixture comprising at least one aliphatic polyisocyanate (B) and at least one alkanolamine (C) selected from the group consisting of triethanolamine, triisopropanolamine, N-methyl-ethanolamine, N-ethyl-ethanolamine, N-butyl-ethanolamine, N-methyl-diethanolamine, N-ethyl-diethanolamine, N-butyl-diethanolamine and N,N-dimethylethanolamine;
  (ii) subsequent reaction of the at least one isocyanate-functional prepolymer (A) with at least one with at least one compound selected from the group consisting of 3-aminosalicylic acid, 4-aminosalicylic acid, 5-aminosalicylic acid and 6-aminosalicylic acid, and sodium salts thereof.

In another preferred embodiment of the presently claimed invention, a polyurethane polymer is obtainable by
  (i) preparation of at least one isocyanate-functional prepolymer (A) by reacting a mixture comprising 1,6-hexamethylene diisocyanate
  which is unmodified or modified by at least one group selected from an allophanate group, a biuret group, an uretdione group, an isocyanurate group and/or an iminooxadiazinedione group
  and at least one alkanolamine (C) selected from the group consisting of triethanolamine, triisopropanolamine, N-methyl-ethanolamine, N-ethyl-ethanolamine, N-butyl-ethanolamine, N-methyl-diethanolamine, N-ethyl-diethanolamine, N-butyl-diethanolamine and N,N-dimethylethanolamine;

(ii) subsequent reaction of the at least one isocyanate-functional prepolymer (A) with at least one with at least one compound selected from the group consisting of 3-aminosalicylic acid, 4-aminosalicylic acid, 5-aminosalicylic acid and 6-aminosalicylic acid, and sodium salts thereof.

Another aspect of the presently claimed invention describes an aqueous composition comprising at least one polyurethane polymer described herein and water. For the purposes of the presently claimed invention, the aqueous composition is a dispersion or colloidal solution.

In an embodiment of the presently claimed invention, the aqueous composition comprises at least one acid selected from the group consisting of inorganic acids and organic acids.

In a preferred embodiment of the presently claimed invention, the inorganic acid is selected from the group consisting of sulfuric acid, hydrochloric acid, phosphoric acid, phosphorous acid, phosphinic acid, polyphosphoric acid, perchloric acid, nitric acid, nitrous acid, sulphurous acid, chloric acid, chlorous acid and hypochlorous acid.

In another preferred embodiment of the presently claimed invention, the organic acid is selected from the group consisting of acetic acid, formic acid, propionic acid, butanoic acid, benzoic acid, phthalic acid, oxalic acid, malonic acid, succinic acid, glutaric acid, adipic acid, lactic acid, citric acid, uric acid and malic acid. In a most preferred embodiment of the presently claimed invention, the at least one acid is selected from the group consisting of phosphorous acid, polyphosphoric acid and acetic acid.

In another embodiment of the presently claimed invention, the aqueous composition comprises at least one organic solvent (E). In a preferred embodiment of the presently claimed invention, the at least one organic solvent (E) is selected from the group consisting of n-methyl-2 pyrrolidone, ethylene glycol dimethyl ether, diethylene glycol methyl ether, propylene glycol methyl ether, propylene glycol butyl ether, dipropylene glycol butyl ether and tripropylene glycol butyl ether.

In a preferred embodiment of the presently claimed invention, an aqueous composition is provided comprising at least one polyurethane polymer described herein, water and at least one acid selected from the group consisting of inorganic acids and organic acids. In another preferred embodiment of the presently claimed invention, an aqueous composition is provided comprising at least one polyurethane polymer described herein, water, at least one acid selected from the group consisting of inorganic acids and organic acids, and at least one organic solvent (E).

In a more preferred embodiment of the presently claimed invention, an aqueous composition is provided comprising at least one polyurethane polymer described herein, water and at least one acid selected from the group consisting phosphorous acid, polyphosphoric acid and acetic acid.

For purposes of the presently claimed invention, the aqueous composition is preferably produced by mixing of the components described hereinabove. The mixing may take place by means of mixers or stirrers known to a skilled person at ambient temperature conditions. The mixing can be carried out either batch-wise or continuously.

An aspect of the presently claimed invention is directed to a metal pre-treatment composition comprising the aqueous composition described herein and at least one water-soluble metal salt or metal.

In a preferred embodiment of the presently claimed invention, the amount of the at least one polyurethane polymer in the metal pre-treatment composition is in the range of ≥5 wt. % to ≤50 wt. %, based on the total weight of the metal pre-treatment composition. In a more preferred embodiment of the amount of the at least one polyurethane polymer in the metal pre-treatment composition is in the range of ≥5.0 wt. % to ≤30 wt. %, based on the total weight of the metal pre-treatment composition.

In a preferred embodiment of the presently claimed invention, the at least one water soluble metal salt is selected from the group consisting of titanium salts, iron salts, zirconium salts and manganese salts.

In another preferred embodiment of the presently claimed invention, the at least one metal is selected from the group consisting of titanium, iron, zirconium and manganese.

In yet another preferred embodiment of the presently claimed invention, the amount of the at least one water soluble metal salt or metal in the metal pre-treatment composition is in the range of ≥0.01 wt. % to ≤10 wt. %, based on the total weight of the metal pre-treatment composition. In a more preferred embodiment of the presently claimed invention, the amount of the at least one water soluble metal salt or metal in the metal pre-treatment composition is in the range of ≥0.5 wt. % to ≤5 wt. %, based on the total weight of the metal pre-treatment composition.

In another preferred embodiment of the presently claimed invention, the amount of water in the metal pre-treatment composition is in the range of ≥50 wt. % to ≤95 wt. %, based on the total weight of the metal pre-treatment composition. In a more preferred embodiment of the presently claimed invention, the amount of water in the metal pre-treatment composition is in the range of ≥70 wt. % to ≤95 wt. %, based on the total weight of the metal pre-treatment composition.

In another preferred embodiment of the presently claimed invention, the pH of the metal pre-treatment composition is in the range ≥1 to ≤6, In a more preferred embodiment of the presently claimed invention, the pH of the metal pre-treatment composition is in the range ≥1.5 to ≤4.

In a preferred embodiment of the presently claimed invention, a metal pre-treatment composition is provided comprising an aqueous composition described herein and at least one water-soluble metal salt selected from the group consisting of titanium salts, iron salts, zirconium salts and manganese salts. In another preferred embodiment of the presently claimed invention, a metal pre-treatment composition is provided comprising an aqueous composition described herein and at least one metal selected from the group consisting of titanium, iron, zirconium and manganese.

In a preferred embodiment of the presently claimed invention, a metal pre-treatment composition is provided comprising an aqueous composition described herein and at least one water-soluble metal salt or metal, wherein the pH of the metal pre-treatment composition is in the range ≥1 to ≤6.

The pH of the metal pre-treatment composition is acidic. The pH value of the metal pre-treatment composition may be adjusted with addition of pH regulators. The pH regulators or adjusting agents is selected preferably from acetic acid and phosphonic acid. The amount of the pH regulator in the metal pre-treatment composition is in the range of ≥1 wt. % to ≤5 wt. %, based on the total weight of the metal pre-treatment composition. Optionally water dispersible or water soluble resins are added to the metal pre-treatment composition to provide toughness and sealing. The amount of the water soluble resin in the metal pre-treatment composition is in the range of ≥0 wt. % to ≤20 wt. %, based on the total weight of the metal pre-treatment composition.

For the purposes of the presently claimed invention, the metal pre-treatment composition may further comprise additives such as surfactants, emulsifiers, lubricity enhancers, fungicides, stability enhancers, levelling agents, anti-friction agents, lubricants, dry lubes, rust preventives and cleaners. The amount of the additives in the metal pre-treatment composition is in the range of ≥0.001 wt. % to ≤10 wt. %, based on the total weight of the metal pre-treatment composition. The metal pre-treatment compositions of the presently claimed invention may be used for permanent coating of metal surfaces. The use of the metal pre-treatment composition as metalworking fluid is especially preferred.

For the purposes of the presently claimed invention, the metal surface to be treated preferably comprises aluminum, an aluminum alloy, steel and/or galvanized steel The preferred metal to be treated includes but are not limited to aluminum alloys, Cu, Si, Mg and/or Zn and the galvanized steel that may be hot-dipped or electrolytically galvanized steel. More preferably, the surface to be treated comprises a mix of different metals, e.g. areas of aluminum/an aluminum alloy as well as areas of (galvanized) steel.

Another aspect of the presently claimed invention is directed to a use of a metal pre-treatment composition described herein for coating a metal substrate.

For the purposes of the presently claimed invention, the metal surface may also be a metal surface coated with a conversion or passivation layer. Preferably, however, it is not coated with a conversion or passivation layer.?

For the purposes of the presently claimed invention, the aqueous composition or the metal pre-treatment composition described herein can preferably be applied as a coating to a metal substrate. Representative examples of the application methods include, but are not limited to, rolling, spraying, spreading, pouring dipping, electroplating. embedding and impregnating.

For the purposes of the presently claimed invention, a metal surface treatment process comprises at least one of the following steps:
(i) degreasing the metal surface;
(ii) rinsing with water;
(iii) drying the metal surface;
(iv) pre-treatment of the metal surface with the metal pre-treatment composition of the presently claimed invention;
(v) curing the applied composition;
(vi) subsequent application of an organic paint, and
wherein the temperature for curing is in the range of from ≥70° C. to ≤240° C., preferably in the range of from ≥70° C. to ≤180° C.

The degreasing step (i) is performed to remove dirt and oil attached onto the surface and a dipping treatment is performed with a degreasing agent which is phosphorous free and nitrogen free for about several minutes at a temperature of 30° C. to 55° C. The rinsing step (ii) is performed by spraying a huge amount of washing water at least once to wash the degreasing agent after the degreasing step. The metal pre-treatment conditions are not particularly limited and may be performed by contacting the metal pre-treatment composition with the metal surface under standard conditions. The pre-treatment is carried out at a temperature in the range of from ≥20° C. to ≤150° C., preferably in the range of from ≥30° C. to ≤130° C. The metal surface treatment time is preferably in the range of from 1 second to 1200 seconds, preferably in the range of from 2 seconds to 20 seconds. The method by which the metal pre-treatment composition and the metal surface is brought into contact is selected from, but is not limited to dipping method, spraying method, roll coating method and flow mechanism method. The curing can be carried by thermal curing and has no peculiarities in terms of method, but instead takes place in accordance with the customary and known methods, such as heating in a forced air oven or irradiation with IR lamps. This thermal curing may also take place in stages. Another preferred curing method is that of curing with near infrared (NIR radiation). The curing preferably takes place advantageously at lower temperatures from ≥70° C. to ≤240° C., more preferably from ≥70° C. to ≤150° C., and enables protection of heat sensitive components.

An aspect of the presently claimed invention is directed to a method for pre-treating a metal substrate comprising at least the step of contacting a metal substrate with the metal pre-treatment composition described herein.

In a preferred embodiment of the presently claimed invention, the method for pre-treating a metal substrate further comprises subsequently contacting the metal substrate with at least one paint.

In a preferred embodiment of the presently claimed invention, a method for pre-treating a metal substrate is provided comprising at least the step of contacting a metal substrate selected from the group consisting of cold rolled sheet, aluminum, aluminum alloys, galvanium hot dip zinc galvanized steel, electrolytically galvanized steel, Al-Zinc magnesium steel, iron and zinc and multi-metal alloys with the metal pre-treatment composition described herein.

In an embodiment of the presently claimed invention, the metal substrate is selected from the group consisting of cold rolled sheet, aluminum, aluminum alloys, galvanium hot dip zinc galvanized steel, electrolytically galvanized steel, Al-Zinc magnesium steel, iron and zinc and multi-metal alloys.

Another aspect of the presently claimed invention is directed to coated metal substrate obtainable by a method for pre-treating a metal substrate described herein.

The aqueous composition or the metal pre-treatment composition of the presently claimed invention advantageously provide corrosion protection, humidity resistance, stability. The metal pre-treatment composition of the presently claimed invention also enable coagulation of metals for treatment. For the purposes of the presently claimed invention, the polyurethane polymer described herein is less sensitive to metal alloy variation in an intermetallic composition and are stable by incorporating the solubility groups into the oligomers. The polymer described herein has strong affinity to the metals and enables strong binding to the metals under metal treatment application conditions. Depending on the intended metal surface treatment, the properties of the composition according to the invention may be tailored by adding different kinds of additives. Representative examples of additives include but are not limited to neutralizers, emulsifiers, lubricity enhancers, metal deactivators and/or stability enhancers for freeze/thaw cycles. Further on, the additives may serve for anti-corrosion, pH-control, coupling, wetting, antimicrobial, antifungal, and/or against foam formation.

EMBODIMENTS

In the following, there is provided a list of embodiments to further illustrate the present disclosure without intending to limit the disclosure to the specific embodiments listed below.

1. A polyurethane polymer which is obtainable by
   (i) preparation of at least one isocyanate-functional prepolymer (A) by reacting a mixture comprising at least one polyisocyanate (B) and at least one alkanolamine (C);
   (ii) subsequent reaction of the at least one isocyanate-functional prepolymer (A) with at least one compound of general formula (I),

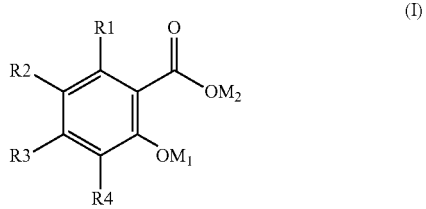

wherein,
R1, R2, R3 and R4, independent of each other, are selected from the group consisting of hydrogen, —C(=O)—OH, —C(=O)—OM$_3$, —OSO$_3$H, —OSO$_3$M$_3$, —OH, —OM$_3$, —C(=O)—H, —O—C$_{1-6}$-alkyl, —F, —Cl, —CN, —Br, —NH$_2$, —NHR and —NRR', wherein at least one of R1, R2, R3 and R4 is selected from the group consisting of —NH$_2$ and —NHR,
M$_1$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra),
M$_2$ is selected from the group consisting of hydrogen and metal cations selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra),
M$_3$ are, identical or different, a metal cation selected from the group consisting of hydrogen (H), lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), and
R and R' are, identical or different, linear or branched, unsubstituted C$_1$-C$_6$ alkyl.

2. The polyurethane polymer according to embodiment 1, wherein the at least one polyisocyanate (B) is at least one aliphatic polyisocyanate.

3. The polyurethane polymer according to embodiment 2, wherein the at least one aliphatic polyisocyanate (B) is modified by at least one group selected from an allophanate group, a biuret group, an uretdione group, an isocyanurate group and/or an iminooxadiazinedione group.

4. The polyurethane polymer according to any of the embodiments 1 to 3, wherein the at least one alkanolamine (C) is selected from the group consisting of triethanolamine, triisopropanolamine, N-methyl-ethanolamine, N-ethyl-ethanolamine, N-butyl-ethanolamine, N-methyl-diethanolamine, N-ethyl-diethanolamine, N-butyl-diethanolamine and N,N-dimethylethanolamine.

5. The polyurethane polymer according to any of the embodiments 1 to 4, wherein the mixture comprises at least one hydroxy-functional polymer (D) selected from the group consisting of polyethylene glycol monoalkyl ether and polypropylene glycol monoalkyl ether.

6. The polyurethane polymer according to embodiment 5, wherein the at least one hydroxy-functional polymer (D) has a weight average molecular weight in the range of ≥150 g/mol to ≤15000 g/mol, determined according to gel permeation chromatography against a polystyrene standard.

7. The polyurethane polymer according to embodiment 5, wherein the at least one hydroxy-functional polymer (D) has a hydroxyl number in the range of ≥25 mg KOH/g to ≤400 mg KOH/g, determined according to DIN 53240-2.

8. The polyurethane polymer according to any of the embodiments 1 to 7, wherein R1, R2, R3 and R4, independent of each other, are selected from the group consisting of hydrogen, —F, —Cl, —CN, —Br, —NH$_2$, —NHR and —NRR', wherein at least one of R1, R2, R3 and R4 is selected from the group consisting of —NH$_2$ and —NHR.

9. The polyurethane polymer according to any of the embodiments 1 to 8, wherein the compound of general formula (I) is selected from the group consisting of 3-aminosalicylic acid, 4-aminosalicylic acid, 5-aminosalicylic acid and 6-aminosalicylic acid, and sodium salts thereof.

10. An aqueous composition comprising at least one polyurethane polymer according to the embodiments 1 to 9 and water.

11. The aqueous composition according to embodiment 10, wherein the aqueous composition comprises at least one acid selected from the group consisting of inorganic acids and organic acids.

12. The aqueous composition according to embodiment 11, wherein the inorganic acid is selected from the group consisting of sulfuric acid, hydrochloric acid, phosphoric acid, phosphorous acid, phosphinic acid, polyphosphoric acid, perchloric acid, nitric acid, nitrous acid, sulphurous acid, chloric acid, chlorous acid and hypochlorous acid.

13. The aqueous composition according to embodiment 11, wherein the organic acid is selected from the group consisting of acetic acid, formic acid, propionic acid, butanoic acid, benzoic acid, phthalic acid, oxalic acid, malonic acid, succinic acid, glutaric acid, adipic acid, lactic acid, citric acid, uric acid and malic acid.

14. The aqueous composition according to embodiment 11, wherein the at least one acid is selected from the group consisting of phosphorous acid, polyphosphoric acid and acetic acid.

15. The aqueous composition according to any of the embodiments 10 to 14, wherein the aqueous composition comprises at least one organic solvent (E).

16. The aqueous composition according to embodiment 15, wherein the at least one organic solvent (E) is selected from the group consisting of n-methyl-2 pyrrolidone, ethylene glycol dimethyl ether, diethylene glycol methyl ether, propylene glycol methyl ether, propylene glycol butyl ether, dipropylene glycol butyl ether and tripropylene glycol butyl ether.

17. A metal pre-treatment composition comprising the aqueous composition according to the embodiments 10 to 16 and at least one water-soluble metal or metal salt.

18. The metal pre-treatment composition according to embodiment 17, wherein the amount of the at least one polyurethane polymer according to the embodiments 1 to 9 is in the range of ≥1 wt. % to ≤50 wt. %, based on the total weight of the metal pre-treatment composition.

19. The metal pre-treatment composition according to embodiment 17 or 18, wherein the at least one water soluble metal salt is selected from the group consisting of titanium salts, iron salts, zirconium salts and manganese salts.

20. The metal pre-treatment composition according to any of the embodiments 17 to 19, wherein the amount of the at least one water soluble metal or metal salt is in the range of ≥0.01 wt. % to ≤10 wt. %, based on the total weight of the metal pre-treatment composition.

21. The metal pre-treatment composition according to any of the embodiments 17 to 20, wherein the amount of water is in the range of ≥50 wt. % to ≤95 wt. %, based on the total weight of the metal pre-treatment composition.

22. The metal pre-treatment composition according to any of the embodiments 17 to 21, wherein the pH of the metal pre-treatment composition is in the range ≥1 to ≤6.

23. A use of a metal pre-treatment composition according to the embodiments 17 to 22 for coating a metal substrate.

24. A method for pre-treating a metal substrate comprising at least the step of contacting a metal substrate with the metal pre-treatment composition according to the embodiments 17 to 22.

25. The method for pre-treating according to embodiment 24, further comprising subsequently contacting the metal substrate with at least one paint.

26. The use or method according to the embodiments 24 or 25, wherein the metal substrate is selected from the group consisting of cold rolled sheet, aluminum, aluminum alloys, galvanium hot dip zinc galvanized steel, electrolytically galvanized steel, Al-Zinc magnesium steel, iron and zinc and multi-metal alloys.

27. A coated metal substrate obtainable by a method according to the embodiments 24 to 25.

EXAMPLES

The presently claimed invention is illustrated in detail by non-restrictive working examples which follow. More particularly, the test methods specified hereinafter are part of the general disclosure of the application and are not restricted to the specific working examples.

Components:
Hydrophilically modified, aliphatic hexamethylene diisocyanate (HDI) polyisocyanate available under the trade name of Bayhydur® 304 from Covestro: NCO % 18.2±0.5
n-methyl-2 pyrrolidone from Aldrich: weight average molecular weight 99.13 g/mol
dimethyl ethanol amine from Huntsman: weight average molecular weight 89.14 g/mol
Methoxypolyethylene Glycol (MPEG350) available under the tradename CARBOWAX™ Methoxypolyethylene Glycol from Dow Chemical: weight average molecular weight range of from 335 g/mol to 365 g/mol
$H_3PO_4$ 75% diluted, from ACROS: weight average molecular weight of 98.0 g/mol
sodium 3-aminosalicylic acid from Aldrich: weight average molecular weight 211.15 g/mol
butylethanol amine from Aldrich: weight average molecular weight 117.9 g/mol
acetic acid, 98% from Fisher Chemical: weight average molecular weight 60.05 g/mol Preparation of the Oligomer Oligomer A:
23.3 g of Bayhydur® 304 and 14.0 g of n-methyl-2 pyrrolidone were added into a reaction flask (250 ml). The above mixture was heated to 72° C. Then, 7.1 g of dimethyl ethanol amine was added into the reaction flask as two shots at equal amount within 10 minutes under agitation. The exotherm was observed and reaction flask was cooled to maintain the temperature in the range of 80° C. to 90° C. for 3 hours. The NCO content was checked, and the NCO peak was measured at 2260 cm-1 using Fourier-transform infrared spectroscopy (FTIR). The reaction mixture was cooled to 50° C. 2.1 g of sodium amino salicylic acid was pre-dissolved with 10 g of n-methyl-2 pyrrolidone and was slowly added into the flask. The temperature was controlled below 70° C. The temperature was maintained at 80° C. for 1 hour after addition of the components. The NCO peak was re-measured to ensure all the NCO has been reacted. The batch was cooled below 50° C. 3.9 g of 75% of $H_3PO_4$ was added under agitation and stirred for 30 minutes. Then 40 g DI (deionized water) water was added under agitation and stirred again for 30 minutes.

Oligomer B:
23.3 g of Bayhydur® 304, 20.0 g of n-methyl-2 pyrrolidone and 6.9 g of MPEG350 were added into a reaction flask (250 ml). The above mixture was heated to 72° C. for 30 minutes. Then, 4.5 g of dimethyl ethanol amine was added into the reaction flask as two shots at equal amount within 10 minutes under agitation. The exotherm was observed and cooled to maintain at 80° C. to 90° C. for 1.5 hours. The NCO content was checked, and NCO peak was measured at 2260 cm-1 using FTIR. The reaction flask was cooled to 50° C. 1.1 g of sodium amino salicylic acid was slowly added into the flask and the temperature was controlled below 70° C. The temperature was maintained at 80° C. for 1 hour after the addition of the components. The NCO peak was measured again to ensure all the NCO has been reacted. The batch was cooled below 50° C. 4.5 g of 75% of $H_3PO_4$ was added under agitation and stirred for 30 minutes. Then 99.0 g of DI water was added under agitation and stirred again for 30 minutes.

Oligomer C:
81.0 g of Bayhydur® 304, 20.0 g of n-methyl-2 pyrrolidone and 16.1 g of MPEG350 were added into a reaction flask (500 ml). The above mixture was heated to 72° C. for 30 minutes. Then 16.7 g of dimethyl ethanol amine was added into the flask slowly within 10 minutes under agitation. The exotherm was observed and cooled to maintain at 80° C. to 90° C. for 1.5 hours. The NCO content was checked, and NCO peak was measured at 2260 cm-1 using FTIR. The flask was cooled to 50° C. 4.8 g of sodium amino salicylic acid was pre-dissolved with 20 g of n-methyl-2 pyrrolidone and was slowly added into the flask. The temperature was controlled below 70° C. The temperature was maintained at 80° C. for 1 hour after the addition of the components. The NCO peak was measured again to ensure all the NCO has been reacted. The batch was cooled below 50° C. 6.5 g of acetic acid (98%) was added under agitation and stirred for 30 minutes. Then 200.0 g of DI water was added under agitation and stirred again for 30 minutes.

Oligomer D:
115.4 g of Bayhydur® 304, 40.0 g of n-methyl-2 pyrrolidone, 17.3 g of MPEG350 were added into a reaction flask (500 ml). The above mixture was heated to 72° C. for 30 minutes. 17.8 g of dimethyl ethanol amine was added into the flask slowly within 10 minutes under agitation. The exotherm was observed and cooled to maintain at a temperature in the range of 80° C. to 90° C. for 1.5 hours. A second flask (1000 ml) was loaded with 23.4 g of butylethanol amine and the above mixture was slowly addition into a second flask and maintained at a temperature around 30° C. to 40° C. for additional 1 hour after the addition of the components. The NCO content was checked, and the NCO peak was measured at 2260 cm-1 with FTIR. 4.0 g of sodium amino salicylic acid was pre-dissolved with 10.0 g of n-methyl-2 pyrrolidone and was slowly added into a second flask. The temperature was controlled below 70° C. The temperature was maintained at 80° C. for 1 hour after the addition of the components. The NCO peak was measured again to ensure all the NCO has been reacted. The batch was cooled below 50° C. 19.6 g of $H_3PO_4$ (75%) was added under agitation and stirred for 30 minutes. Then 300.0 g of DI water was added under agitation and stirred again for 30 minutes.

Preparation of Metal Pre-Treatment Compositions
Example 1 was prepared using the oligomer A.
Example 2 was prepared using the oligomer C.
Comparative example 1 was prepared identical to example 1 without oligomer A.
Comparative example 2 was prepared identical to example 2 without oligomer C.

Example 3: Oligomer A blend with commercial cationic polyurethane dispersion (CUD 4820 from Alberdingk boley)

Comparative example 3: example 3 with only CUD 4820 at same weight percentage of polyurethane Example 4: Was prepared the same as comparative example 1.0.3% salicylic acid was added, and solution was stirred for additional 1 hour Example 5: Was prepared the same as comparative example 1.0.3% 5-sulfosalicylic acid was added, and solution was stirred for additional 1 hour.

Example 6: Was prepared the same as comparative example 1.0.3 (Sodium 4-amino salicylate was added, and the solution was stirred for 1 hour

TABLE 1

Metal pre-treatment compositions and stability

| Example | PH | F (wt. %) | Ti (wt. %) | Si (wt. %) | N (wt. %) | P (wt. %) | Mn (wt. %) | Ratio of inorganic/organic | Oligomer A (wt. % on solid) | Oligomer C (wt. % on solid) | Polyurethane commercial | Salicylic/derivative wt. % | Formulation Stability (RT) |
|---|---|---|---|---|---|---|---|---|---|---|---|---|---|
| Comparative Example 1 | <2 | 0.65 | 0.35 | 0.08 | 0.04 | 0.75 | 0.41 | 3.0:1 | | | | | stable |
| Example 1 | <2 | 0.65 | 0.35 | 0.08 | 0.04 | 0.75 | 0.41 | 3.0:1 | 3.5 | | | | stable |
| Comparative Example 2 | <2 | 0.65 | 0.35 | 0.08 | 0.04 | 0.75 | 0.41 | 2.8:1 | | | | | stable |
| Example 2 | <2 | 0.65 | 0.35 | 0.08 | 0.04 | 0.75 | 0.41 | 2.8:1 | | 3.8 | | | stable |
| Comparative Example 3 | <2 | 0.65 | 0.27 | 0.27 | 0.07 | 0.75 | 0.55 | 3.1:1 | | | 2.6 | | Thicken in One month |
| Example 3 | <2 | 0.65 | 0.27 | 0.27 | 0.07 | 0.75 | 0.55 | 3.1:1 | 0.5 | | 2.1 | | Thicken in three weeks |
| Example 4 | <2 | 0.65 | 0.35 | 0.08 | 0.04 | 0.75 | 0.41 | 3:0:1 | | | | 0.3 (salicylic acid) | SA is not dissolved |
| Example 5 | <2 | 0.65 | 0.35 | 0.08 | 0.04 | 0.75 | 0.41 | 3:0:1 | | | | 0.3, 5-sulfosalicyclic acid | Stable/Poor performance |
| Example 5 | <2 | 0.65 | 0.35 | 0.08 | 0.04 | 0.75 | 0.41 | 3:0:1 | | | | 0.3 (Sodium 4-aminosalicylate) | Precipitation after 2 days |

Preparation of the Coating Panels
1. Galvalume (GL), Cold Rolled Sheet (CRS) and Aluminum (Al) substrates from ACT were cleaned with Gardoclean® S 5654 at 1% to 3%, 50° C. to 60° C. for 4 seconds to 15 seconds (spray) till the water break free. The substrates were rinsed with water and D I water respectively for 5 seconds to 10 seconds. The panels were dried by squeegee rolled followed by a compressed air blow-off.
2. The cleaned panels were treated with a lab reverse rolled coater (Mathis Model 95E ZC300CAMAA) with adjustment of the coating weight base on Ti content (PORTASPEC, Model 2501). The pre-treated substrates (except Aluminum) were primed with non-Cr polyester (by Valspar) using a #10 Drawbar and baked in oven (Despatch model VRE2-10-2E) to the peak metal temperature suggested in the paint SDS to obtain a nominal dry film thickness (DFT) of close to 6 microns. The Aluminum was directly top coated with a non-Cr polyester from Valspar (|Sandstone polyester) using a #22 bar to obtain a nominal DFT of 12 microns.

TABLE 2

Evaluation of adhesion, T-bend, reverse impact and corrosion

| Examples | Substrate | Adhesion | T-bend 1T | Reverse impact | Corrosion NSS creepage/Blister density on Surface | Cut edge corrosion Creepage on AZ |
|---|---|---|---|---|---|---|
| Comparative 1 | Al | 3B | Failed | Failed | 1 to 2 mm (1000 hours) with Med. Dense blister (D(6)) | |
| | AZ | — | — | — | | N/A |
| | CRS | 1B | Failed | Failed | >3 mm (500 hour) | |
| Example 1 | Al | 4B | failed | pass | 1 to 2 mm (1000 hours) with Med. Dense blister (D(6)) | |
| | AZ | — | — | — | | N/A |
| | CRS | 5B | pass | pass | <2 mm (500 hour) | |
| Comparative 2 | Al | 5B | Pass | Pass | 1 to 2 mm (1000 hours)/D(6) | |
| | AZ | 5B | Pass | Pass | <3 mm (1000 hours) | >10 mm cut edge |
| | CRS | 1B | Failed | Failed | >3 mm (500 hour) | |
| Example 2 | Al | 5B | Pass | Pass | <1 mm (1000 hours)/ (very few blisters)F(9) | |
| | AZ | 5B | Pass | Pass | <3 mm (1000 hours) | <6 mm cut edge |
| | CRS | 5B | Pass | Pass | <3 mm (500 hour) | |
| Comparative 3 | Al | 4B | failed | failed | ~1 mm with D(6) (1000 hour) | |
| | AZ | 5B | Pass | Pass | 2-3 mm (1000 hours) | >10 mm cut edge |
| | CRS | 5B | failed | Pass | >3 mm (500 hours) | |
| Example 3 | Al | 5B | Pass | Pass | <1 mm (1000 hours)/F(9) | |
| | AZ | 5B | Pass | Pass | 2-3 mm (1000 hours) | <7 mm cut edge |
| | CRS | 5B | Pass | Pass | <2 mm (500 hours) | |
| Example 5 (comparative 1 with Sulfonate salicylic acid) | Al | 3B | Failed | Failed | 1 to 2 mm (1000 hours)/ Severe Blister D(2) | |
| | AZ | — | — | — | | N/A |
| | CRS | 4B | Failed | Failed | >3 mm (500 hour)/ severe blisters (D(2)) | |

Discussion of Results

FTIR of oligomer A indicated the overlapping of OH 0-H Stretch, (broad, s) with Urea N—H stretch 3400-3300 (M) at wavenumber range (3100 to 3700) is shown in FIG. 1. Free OH existed in Oligomer A.

1) With addition of the oligomer A into Example 1, good coating performances of adhesion, T-bend, reverse impact, and corrosion resistance on CRS were achieved. Improvements of adhesion and reverse impact were also clearly observed on Al.
2) oligomer C was added in formulation 2, compared to the comparative example 2, improvements on T-bend, adhesion, and reverse impact on CRS were obtained without sacrificing the performances on Al. Blister density on Al and cutting edge corrosion on AZ were improved after corrosion test.
3) In example 3 and comparative example 3, commercially available non-functional cationic polyurethane was also added. Example 3 showed that addition of oligomer A helped the adhesion and T bend performance and blister reduction specially on Al. The cutting edge corrosion was also improved. Due to the long term instability of the formula, no further tests been done.
4) In example 5, 0.3% 3,5-sulfosalicylic acid was added into comparative example 1. The resulted formula was stable. But severe blistering was observed after corrosion test.
5) Due to the instability of the formula 5, no test been done.
6) The added salicylic acid was not soluble in Example 4. No further tests been done.

Test Methods

Stability Determination:

The prepared formula was put inside oven at 45 C for 4 weeks. Stability was measured by observing the sludge formation and monitoring the solution viscosity change.

Adhesion Determination

The Cross-Hatch adhesion was determined in accordance with the Standard Test Method ASTM D3359. This test is for assessing the adhesion of relatively ductile coating films to metallic substrates by applying and removing pressure-sensitive tape (3M #610 tape) over cuts made in the film. A rating is provided from 5B to 0B, where 5B is the best and 0B is the worst.

T-Bend Determination

The T-Bend was determined in accordance with the Standard Test Method ASTM D4145. This test method describes a procedure for determining the flexibility and adhesion of organic coatings (paints) on metallic substrates that are deformed by bending when the sheet is fabricated into building panels or other products. No tape removal with #M #610 tape is considered as pass.

Reverse Impact Determination

The Reverse impact was determined in accordance with the Standard Test Method ASTM D2794. The weight loads (lbs) 3× gauge was tested on all substrates except aluminum which was 1.5× gauge. This method tests the flexible characteristics of the paint film and its ability to stretch. The deformed films are taped with 3M #610 tape. No paint taping off is considered as pass.

Corrosion Resistance Determination

The corrosion resistance was determined by Neutral Salt Spray (NSS) in accordance with the Standard Test Method ASTM D1654. According to ASTM D1654 protocol, 6 measurements along and across the scribe are measured, the scribe width is subtracted, and then divided by 2 to determine the creepage. The values in millimeter (mm) are averaged of creepage. The readings are validated only with specified testing hours.

Blister Density Determination

The blister density was recorded based on ASTM D714. This test method employs photographic reference standards to evaluate the degree of blistering that may develop when paint systems are subjected to conditions which will cause blistering. For a value of 0 to 10 for blister size, 10=no blister: Frequency is described as F=Few; M=Medium; D=Dense.

The invention claimed is:

1. A polyurethane polymer which is obtained by
   (i) preparing at least one isocyanate-functional prepolymer (A) by reacting a mixture comprising at least one polyisocyanate (B) and at least one alkanolamine (C); and
   (ii) subsequently reacting the at least one isocyanate-functional prepolymer (A) with at least one compound of general formula (I),

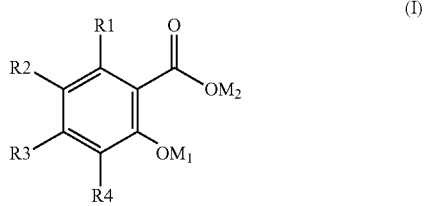

wherein,
R1, R2, R3 and R4, independent of each other, are selected from the group consisting of hydrogen, —C(═O)—OH, —C(═O)—OM$_3$, —SO$_3$H, —SO$_3$M$_3$, —H, —OM$_3$, —C(═O)—H, —C$_{1-6}$-alkyl, —F, —Cl, —CN, —Br, —NH$_2$, —NHR and —NRR', wherein at least one of R1, R2, R3 and R4 is selected from the group consisting of —NH$_2$ and —NHR M$_1$ is selected from the group consisting of hydrogen and metal cations selected from the group consisting of lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_2$ is selected from the group consisting of hydrogen and metal cations selected from the group consisting of lithium (Li), sodium (Na), potassium (K), rubidium (Rb), cesium (Cs), francium (Fr), beryllium (Be), magnesium (Mg), calcium (Ca), strontium (Sr), barium (Ba), and radium (Ra), M$_3$ are, identical or different, a metal cation selected from the group consisting of lithium (Li), sodium (Na), potassium (K), rubidium (Rb), cesium (Cs), francium (Fr),
   beryllium (Be), magnesium (Mg), calcium (Ca), strontium (Sr), barium (Ba), and radium (Ra) and R and R' are, identical or different, linear or branched, unsubstituted C$_1$-C$_6$ alkyl;
wherein the at least one polyisocyanate (B) is selected from the group consisting of aliphatic polyisocyanates.

2. The polyurethane polymer according to claim 1, wherein the at least one polyisocyanate (B) is modified by at least one group selected from the group consisting of an allophanate group, a biuret group, an uretdione group, an isocyanurate group and an iminooxadiazinedione group.

3. The polyurethane polymer according to claim 1, wherein the at least one alkanolamine (C) is selected from the group consisting of triethanolamine, triisopropanolamine, N-methyl-ethanolamine, N-ethyl-ethanolamine, N-butyl-ethanolamine, N-methyl-diethanolamine, N-ethyl-diethanolamine, N-butyl-diethanolamine and N,N-dimethylethanolamine.

4. The polyurethane polymer according to claim 1, wherein the mixture comprises at least one hydroxy-functional polymer (D) selected from the group consisting of polyethylene glycol monoalkyl ether and polypropylene glycol monoalkyl ether.

5. The polyurethane polymer according to claim 1, wherein R1, R2, R3 and R4, independent of each other, are selected from the group consisting of hydrogen, —F, —Cl, —CN, —Br, —NH$_2$, —NHR and —NRR', wherein at least one of R1, R2, R3 and R4 is selected from the group consisting of —NH$_2$ and —NHR.

6. The polyurethane polymer according to claim 1, wherein the compound of general formula (I) is selected from the group consisting of 3-aminosalicylic acid, 4-aminosalicylic acid, 5-aminosalicylic acid and 6-aminosalicylic acid, and sodium salts thereof.

7. An aqueous composition comprising at least one polyurethane polymer according to claim 1 and water.

8. The aqueous composition according to claim 7, wherein the aqueous composition comprises at least one acid selected from the group consisting of inorganic acids and organic acids.

9. The aqueous composition according to claim 7, wherein the aqueous composition comprises at least one organic solvent (E).

10. A metal pre-treatment composition comprising the aqueous composition according to claim 7 and at least one water-soluble metal salt or metal.

11. A method of using the metal pre-treatment composition according to claim 10, the method comprising using the metal pre-treatment composition for coating a metal substrate.

12. A method for pre-treating a metal substrate comprising at least the step of contacting a metal substrate with the metal pre-treatment composition according to claim 10.

13. The method of use according to claim 11, wherein the metal substrate is selected from the group consisting of cold rolled sheet, aluminum, aluminum alloys, galvanium hot dip zinc galvanized steel, electrolytically galvanized steel, Al-Zinc magnesium steel, iron and zinc and multi-metal alloys.

14. A coated metal substrate obtained by the method of use according to claim 11.

15. The method according to claim 12, wherein the metal substrate is selected from the group consisting of cold rolled sheet, aluminum, aluminum alloys, galvanium hot dip zinc galvanized steel, electrolytically galvanized steel, Al-Zinc magnesium steel, iron and zinc and multi-metal alloys.

16. A coated metal substrate obtained by a method according to claim 12.

17. The polyurethane polymer according to claim 1, wherein the at least one polyisocyanate (B) is selected from the group consisting of 1,6-hexamethylene diisocyanate (HDI), methylene dicyclohexyl diisocyanate, tetramethylene diisocyanate, 1,5-pentamethylene diisocyanate, 2,2,4- (or 2,4,4-) trimethyl-1,6-hexamethylene diisocyanate, hydrogenated methylene diisocyanate (HMDI) and isophorone diisocyanate (IPDI), all of which are optionally modified by at least one group selected from an allophanate group, a biuret group, an uretdione group, an isocyanurate group and an iminooxadiazinedione group.

\* \* \* \* \*